(12) United States Patent
Chewter et al.

(10) Patent No.: US 9,537,758 B2
(45) Date of Patent: *Jan. 3, 2017

(54) DYNAMIC REDIRECTION OF NETWORK TRAFFIC WITHIN A SYSTEM UNDER TEST

(71) Applicant: International Business Machines Corporation, Armonk, NY (US)

(72) Inventors: John N. Chewter, London (GB); Peter Cole, Romsey (GB); Daniel S. Pollitt, Winchester (GB); Geoffrey D. Walters, Ringwood (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,681

(22) Filed: Sep. 28, 2015

(65) Prior Publication Data

US 2016/0020995 A1 Jan. 21, 2016

Related U.S. Application Data

(63) Continuation of application No. 13/534,508, filed on Jun. 27, 2012, now Pat. No. 9,166,909, which is a
(Continued)

(51) Int. Cl.
*G06F 15/177* (2006.01)
*H04L 12/707* (2013.01)
(Continued)

(52) U.S. Cl.
CPC ............ *H04L 45/22* (2013.01); *H04L 41/14* (2013.01); *H04L 41/145* (2013.01); *H04L 43/00* (2013.01);
(Continued)

(58) Field of Classification Search
CPC ....... H04L 43/00–43/50; H04L 41/14–41/147; H04L 67/2814
See application file for complete search history.

(56) References Cited

U.S. PATENT DOCUMENTS 5,339,430 A 8/1994 Lundin et al.
5,410,703 A 4/1995 Nilsson et al.
(Continued)

FOREIGN PATENT DOCUMENTS

WO 02101560 A1 12/2002
WO 2009156980 A1 12/2009

OTHER PUBLICATIONS

Hundessa, L. et al., "Fast Rerouting Mechanism for a Protected Labeled Switch Path," In Proc. of 10th Int'l. Conf. on Computer Communications and Networks, 2001, pp. 527-530.
(Continued)

*Primary Examiner* — Brendan Higa
(74) *Attorney, Agent, or Firm* — Cuenot, Forsythe & Kim, LLC

(57) ABSTRACT

Redirecting network traffic within a system under test (SUT) can include receiving, within a proxy included within the SUT, a request sent from an upstream component that is directed to a downstream component, wherein the upstream component is configured to direct communications through the proxy. Within the proxy, the request can be redirected from the downstream component to a simulation component according to a routing rule within the proxy using a processor. A response can be received, within the proxy, from the simulation component and sent to the upstream component.

17 Claims, 4 Drawing Sheets

Related U.S. Application Data continuation of application No. 13/490,814, filed on Jun. 7, 2012, now Pat. No. 9,160,653.

(51) Int. Cl.
  *H04L 12/26* (2006.01)
  *H04L 12/24* (2006.01)
  *H04L 12/717* (2013.01)
  *H04L 29/08* (2006.01)

(52) U.S. Cl.
  CPC ............... *H04L 43/50* (2013.01); *H04L 45/42* (2013.01); *H04L 67/02* (2013.01); *H04L 67/28* (2013.01); *H04L 67/2814* (2013.01); *H04L 67/2861* (2013.01)

(56) References Cited

U.S. PATENT DOCUMENTS

| | | | |
|---|---|---|---|
| 8,001,422 | B1 | 8/2011 | Sun et al. |
| 8,230,325 | B1 | 7/2012 | Sun et al. |
| 8,248,958 | B1 | 8/2012 | Tulasi et al. |
| 9,160,653 | B2 | 10/2015 | Chewter et al. |
| 9,166,909 | B2 | 10/2015 | Chewter et al. |
| 2003/0012141 | A1 | 1/2003 | Gerrevink |
| 2003/0131285 | A1 | 7/2003 | Beardsley et al. |
| 2009/0187654 | A1 | 7/2009 | Raja et al. |
| 2010/0103837 | A1 | 4/2010 | Jungck et al. |
| 2010/0118895 | A1 | 5/2010 | Radulescu |
| 2011/0072506 | A1 | 3/2011 | Law et al. |
| 2011/0122879 | A1 | 5/2011 | Elmasry et al. |
| 2011/0142057 | A1 | 6/2011 | Deal et al. |
| 2011/0208838 | A1 | 8/2011 | Thomas et al. |
| 2012/0047492 | A1 | 2/2012 | Huang et al. |
| 2012/0124193 | A1 | 5/2012 | Ebrahim et al. |
| 2013/0332624 | A1 | 12/2013 | Chewter et al. |
| 2013/0332625 | A1 | 12/2013 | Chewter et al. |

OTHER PUBLICATIONS

Wittenberg, N., "Understanding Voice over IP Technology," Cengage Learning © 2009, Feb. 19, 2009, pp. 299-300, 303-307.
U.S. Appl. No. 13/490,814, Non-Final Office Action, Jun. 19, 2014, 10 pg.
U.S. Appl. No. 13/490,814, Non-Final Office Action, Nov. 5, 2014, 8 pg.
U.S. Appl. No. 13/490,814, Final Office Action, Mar. 17, 2016, 9 pg.
U.S. Appl. No. 13/490,814, Notice of Allowance, Jun. 5, 2015, 7 pg.
U.S. Appl. No. 13/534,508, Non-Final Office Action, May 5, 2014, 9 pg.
U.S. Appl. No. 13/534,508, Non-Final Office Action, Oct. 28, 2014, 8 pg.
U.S. Appl. No. 13/534,508, Final Office Action, Mar. 25, 2015, 9 pg.
U.S. Appl. No. 13/534,508, Notice of Allowance, Jun. 16, 2015, 5 pg.

DYNAMIC REDIRECTION OF NETWORK TRAFFIC WITHIN A SYSTEM UNDER TEST

CROSS-REFERENCE TO RELATED APPLICATIONS

This application is a Continuation of U.S. application Ser. No. 13/534,508, filed on Jun. 27, 2012, which is a Continuation of U.S. application Ser. No. 13/490,814, filed on Jun. 7, 2012, the entirety of which is incorporated herein by reference.

BACKGROUND

Creating and managing test environments for complex, distributed systems requires extensive computing resources, monetary resources, and time. Proper testing of a system under test (SUT) requires the development and maintenance of multiple test scenarios, e.g., test cases, in parallel. To support this parallelism in the test environment, the SUT is replicated, with each replicated version of the SUT implementing a specific and different test case. Each replicated SUT must satisfy a variety of different requirements ranging from hardware requirements, to software requirements, to licensing requirements.

Simulation components have been used within SUT(s) as a means of avoiding some of the aforementioned complexities. For example, a simulation component can be used within an SUT to replace a given component of the SUT by simulating the behavior of the replaced component. In this manner, the simulation component helps to avoid test environment replication. Simulation components also allow test personnel to verify interactions between components while forcing components to exhibit specific behavior needed for the test cases to be exercised.

BRIEF SUMMARY

One or more embodiments disclosed within this specification relate to testing a system under test (SUT) having a plurality of different components that communicate over a network and dynamically redirecting network traffic within the SUT.

An embodiment can include a method. The method can include receiving, within a proxy included within a SUT, a request sent from an upstream component that is directed to a downstream component, wherein the upstream component is configured to direct communications through the proxy. The request can be redirected, within the proxy, from the downstream component to a simulation component according to a routing rule within the proxy using a processor. A response from the simulation component can be received within the proxy. The response can be sent to the upstream component.

Another embodiment can include a system. The system can include a processor configured to initiate executable operations. The executable operations can include receiving, within a proxy included within a SUT, a request sent from an upstream component that is directed to a downstream component, wherein the upstream component is configured to direct communications through the proxy. The request can be redirected, within the proxy, from the downstream component to a simulation component according to a routing rule within the proxy. A response from the simulation component can be received within the proxy. The response can be sent to the upstream component.

Another embodiment can include a computer program product. The computer program product can include a computer readable storage medium having computer readable program code embodied therewith that, when executed, configures a processor to perform executable operations. The executable operations can include receiving, within a proxy included within a SUT, a request sent from an upstream component that is directed to a downstream component, wherein the upstream component is configured to direct communications through the proxy. The request can be redirected, within the proxy, from the downstream component to a simulation component according to a routing rule within the proxy. A response from the simulation component can be received within the proxy. The response can be sent to the upstream component.

DETAILED DESCRIPTION

Figure 1:
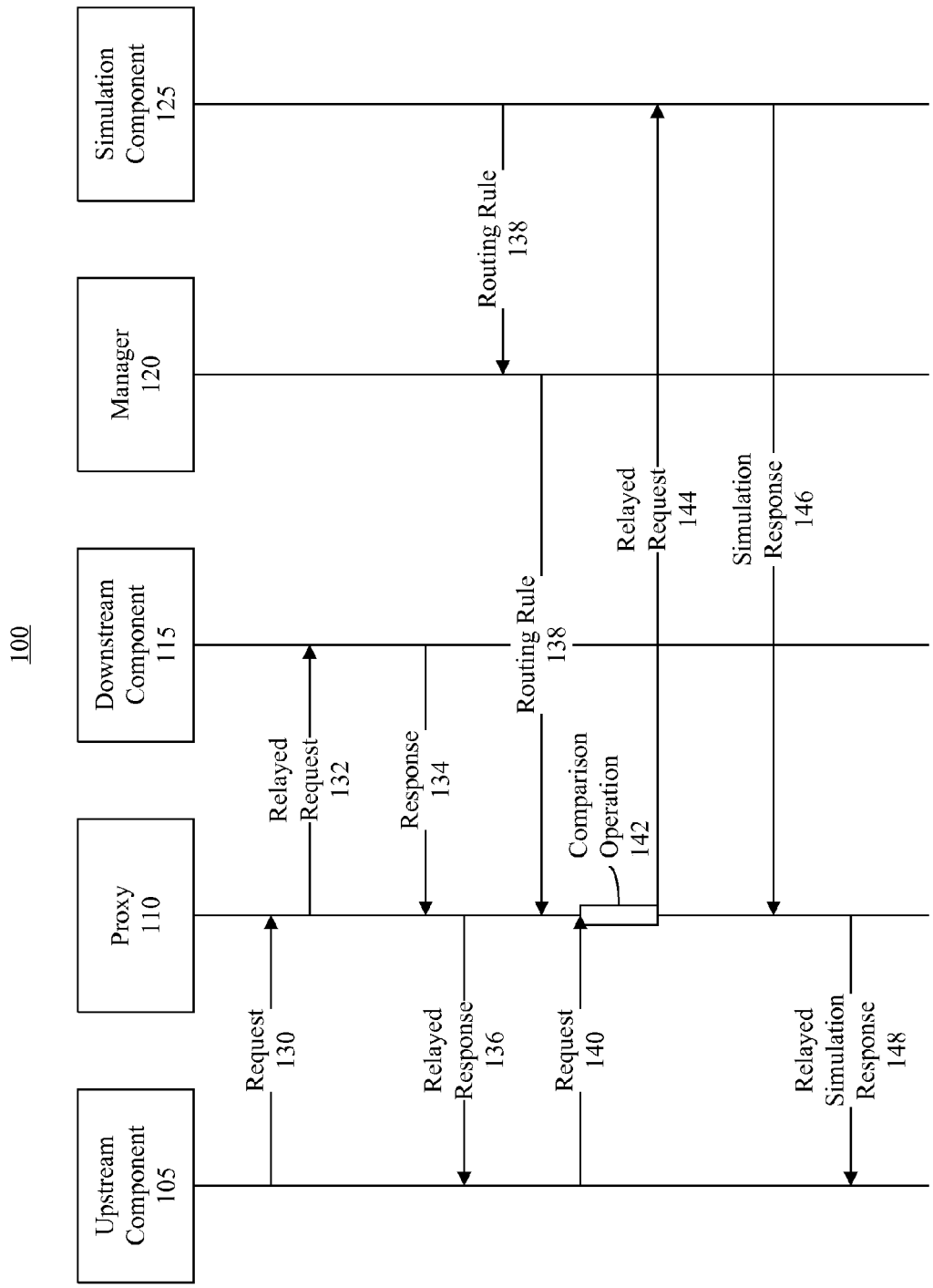
FIG. 1 is a message flow diagram illustrating a system under test in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on one or more remote computers, or entirely on the remote computer(s) or server(s). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to testing a system under test (SUT) having a plurality of different components that communicate over a network and dynamically redirecting network traffic within the SUT. In accordance with the inventive arrangements disclosed within this specification, one or more test components, e.g., a proxy, a manager, and one or more simulation components, can be incorporated into a SUT. The proxy can redirect communications from components of the SUT to simulation components based upon one or more rules implemented within the proxy and coordinated by the manager.

FIG. 1 is a message flow diagram illustrating an SUT (100) in accordance with an embodiment disclosed within this specification. SUT 100 represents a computing environment for testing purposes in which various data processing systems, each with one or more applications executing therein, communicate with one another over a network. As shown, SUT 100 includes an upstream component 105, a proxy 110, a downstream component 115, a manager 120, and a simulation component 125.

Upstream component 105, proxy 110, downstream component 115, manager 120, and simulation component 125 each can be implemented as a data processing system executing a suitable computer program. Upstream component 105, proxy 110, downstream component 115, manager 120, and simulation component 125 each can be configured to communicate with one another as described within this specification over a network (not shown).

For purposes of illustration, each of the blocks illustrated in FIG. 1 are described as separate data processing systems. The one or more embodiments disclosed within this specification, however, are not intended to be limited by the example provided. It should be appreciated that one or more of the aforementioned blocks of SUT 100 can be included, or implemented, within a same data processing system. For example, proxy 110 and manager 120 can be implemented within a same data processing system. In another example, simulation component 125 can be incorporated within a same data processing system as another block. In an embodiment in which two or more components are implemented within a same data processing system, each individual component within the data processing system still can be independently addressable via the network.

Conventionally, upstream component 105 collaborates, e.g., communicates, directly with downstream component 115. In order to incorporate proxy 110 into SUT 100, the various upstream components within SUT 100, e.g., upstream component 105, are configured to utilize proxy 110. For example, each upstream component of SUT 100 can include a preference or setting that allows an administrator to instruct the upstream component to direct communications through proxy 110 as part of SUT 100.

As used within this specification, the phrase "upstream component" refers to a service, application, or the like, executing within a data processing system, that invokes or calls another service, application, or the like executing within a data processing system. In one aspect, the upstream component invokes the service, application, or the like over a network. In another aspect, the upstream component invokes the service, application, or the like locally, e.g., in the case where the element being invoked executes within the same data processing system as the upstream component. A "downstream component" refers to a service, application, or the like, executing within a data processing system that is called or invoked by an upstream component. Thus, referring to FIG. 1, upstream component 105 sends a request to downstream component 115. Downstream component 115 sends a response to the request to upstream component 105. Upstream component 105 is a client of downstream component 115, which functions as a server in reference to a client-server model.

Proxy 110, manager 120, and simulation component 125 are test components that are incorporated, or included, within SUT 100 for purposes of testing only. For example, were SUT 100 to be released into the field as an operational system, SUT 100 would include only upstream component 105 and downstream component 115. Upstream component 105 and downstream component 115 would communicate with one another without proxy 110 as an intermediary. It should be appreciated that the number of upstream components and downstream components illustrated within SUT 100 are for purposes of illustration only and, as such, are not intended as limitations. Additional upstream and/or downstream components can be included within SUT 100 without limitation.

In the test computing environment illustrated in FIG. 1, upstream component 105 and downstream component 115 communicate with one another via proxy 110. In general, downstream component 115 can be viewed as an enabler for testing one or more aspects of upstream component 105. As such, simulation component 125 can be included within SUT 100 as a replacement for downstream component 115 in selected circumstances, e.g., for selected transactions, for testing purposes. Simulation component 125 can be configured to behave as downstream component 115 in response to one or more different types of requests that can be issued by upstream component 105, for example. In this manner, functionality of upstream component 105 can be tested through interactions with simulation component 125 in lieu of downstream component 115.

As an example, consider the case in which downstream component 115 is implemented as a Web service. The Web service includes one or more operations that are accessible via Simple Object Access Protocol (SOAP) over Hypertext Transfer Protocol (HTTP). The Web service is accessible by way of a Uniform Resource Locator (URL) addressable network endpoint. To enable selective simulation of a subset of Web service invocations, any upstream components of that Web service, e.g., upstream component 105, are reconfigured to communicate via proxy 110 for HTTP.

Proxy 110 receives an HTTP request message from upstream component 105 and evaluates the request with respect to any routing rules implemented within proxy 110 for the current test session. Evaluating the routing rules can include matching properties of the request such as, for example, the source of the request (e.g., upstream component originating the request), the destination of the request, or other elements of the request such as elements within a header of the request, elements within a payload of the request, etc., to routing rules. In another aspect, one or more elements that are not directly specified by the request, but determinable by proxy 110 can be compared with the routing rules. For example, proxy 110 can compare the URL of the destination of the request, a header field of the HTTP request (e.g., a "SOAPAction" or some property of the SOAP message and/or payload), or the like.

A request, or a response to the request, can specify data in a variety of different ways. For example, a request (or response) specifies data either directly or indirectly. Data specified directly refers to data that is included within the request itself and, as such, is specified explicitly. Data specified indirectly refers to data that is determinable using the request, but not explicitly included within the request. Data specified indirectly by a request can include data that is determined by contacting one or more other network nodes and/or data processing systems as part of the request/response transaction. For example, a transaction, e.g., the request and corresponding response, can specify a destination endpoint indirectly in that the destination endpoint can be determined by querying on the network connection to determine information such as the hostname and/or port. Thus, the request can specify the transaction data, the network connection across which the transaction is conducted, or the like.

When the request matches a routing rule, the request can be rerouted, e.g., redirected, to a simulation endpoint specified by the matching routing rule in lieu of the original destination specified by the request. Proxy 110 further relays the corresponding response received back from the simulation endpoint to upstream component 105. If proxy 110 determines that the request does not match a routing rule, e.g., proxy 110 determines that the request is not to be simulated, proxy 110 forwards the request to the original endpoint specified by the request.

Referring again to FIG. 1, in operation, SUT 100 can begin a test session in which upstream component 105 is configured to utilize proxy 110. In executing a particular test case, for example, upstream component 105 sends a request 130. Request 130 is intended for downstream component 115, which is the original destination of request 130. As shown, request 130 is received, e.g., intercepted, by proxy 110.

In the example illustrated in FIG. 1, proxy 110 begins operation without any routing rules implemented therein. Proxy 110, for example, can maintain a proxy rule base in which routing rules are stored. At the start of the test session illustrated in FIG. 1, the proxy rule base includes no routing rules, e.g., is empty. Accordingly, proxy 110 operates in a default mode in which communications pass through proxy 110 unaffected. The default behavior of proxy 110 is that SUT 100 is functionally equivalent to an operational state in which proxy 110, manager 120, and simulation component 125 are not included within SUT 100.

Responsive to receiving request 130, proxy 110 determines that request 130 does not match any routing rules, as none have been implemented. Proxy 110 sends, or forwards, request 130 to downstream component 115 in the form of relayed request 132. Relayed request 132 is the same as request 130, e.g., unchanged. For example, while different reference numbers are utilized, request 130 can be said to "pass through" proxy 110 unchanged as relayed request 132.

Downstream component 115 receives relayed request 132 and, in response, sends response 134. Response 134 is directed to proxy 110. Proxy 110 determines that response 134 is directed to upstream component 105 and sends, e.g., forwards, relayed response 136 to upstream component 105. Relayed response 136 is the same as response 134. For example, while different reference numbers are utilized, response 134 can be said to "pass through" proxy 110 unchanged as relayed response 136.

For purposes of illustration, simulation component 125 publishes a routing rule 138 to manager 120. In one aspect, test personnel can interact with SUT 100 by way of an administrative console or the like. For example, test personnel can activate simulation component 125 to take the place of downstream component 115 for one or more selected transactions as defined by routing rule 138. In general, each routing rule 138 defines criteria to which a communication, e.g., a request, can be matched and a destination to which a matching communication is to be redirected. In this example, test personnel, by way of an administrative console, have created a routing rule for simulation component 125 that simulation component 125 publishes to manager 120.

Manager 120 is configured to manage and coordinate routing rules that are to be implemented and applied within proxy 110. In managing the routing rules, for example, manager 120 can maintain a manager rule base that is coordinated, e.g., synchronized, with the proxy rule base maintained within proxy 110. Manager 120, for example, can compare each new routing rule received from a simulation component with any routing rules already stored within the manager rule base to determine whether the new routing rule conflicts with the existing routing rules.

Responsive to the publication of routing rule 138 to manager 120, manager 120 sends routing rule 138 to proxy 110. In one embodiment, manager 120 also performs a conflict check so that routing rule 138 is only forwarded to proxy 110 responsive to a determination that the routing rule 138 does not conflict with any existing routing rules in the manager rule base.

Responsive to receiving routing rule 138, proxy 110 begins comparing each newly received request to routing rule 138 as well as any other routing rules that have been implemented within proxy 110. For purposes of illustration, routing rule 138 can specify that any communication that is directed to downstream component 115 from upstream component 105 is to be redirected to simulation component 125.

Subsequent to implementing routing rule 138 within proxy 110 and during the same test session, upstream component 105 can send request 140 to proxy 110. Request 140 can have an intended, e.g., original, destination of downstream component 115. Responsive to receiving request 140, proxy 110 can compare request 140 with routing rule 138 as illustrated by comparison operation 142. Proxy 110, through a comparison of request 140 with routing rule 138, determines that request 140 matches the criteria specified within routing rule 138. Accordingly, proxy 110, responsive to determining that request 140 matches routing rule 138, redirects request 140 to simulation component 125 as relayed request 144. Relayed request 144 can be substantially the same as request 140 with the exception that the request has been modified to specify simulation component 125 as the destination instead of downstream component 115.

Responsive to receiving relayed request 144, simulation component 125 can send simulation response 146 to proxy 110. Proxy 110 determines that simulation response 146 is directed to upstream component 105 and, as such, sends relayed simulation response 148 to upstream component 105.

Accordingly, proxy 110 functions as an intermediary between upstream components of SUT 100 and downstream components of SUT 100. Proxy 110 only intervenes in redirecting communications, e.g., requests in the example of FIG. 1, when proxy 110 determines that a received communication matches a routing rule that has been implemented therein for the current testing session.

Figure 2:
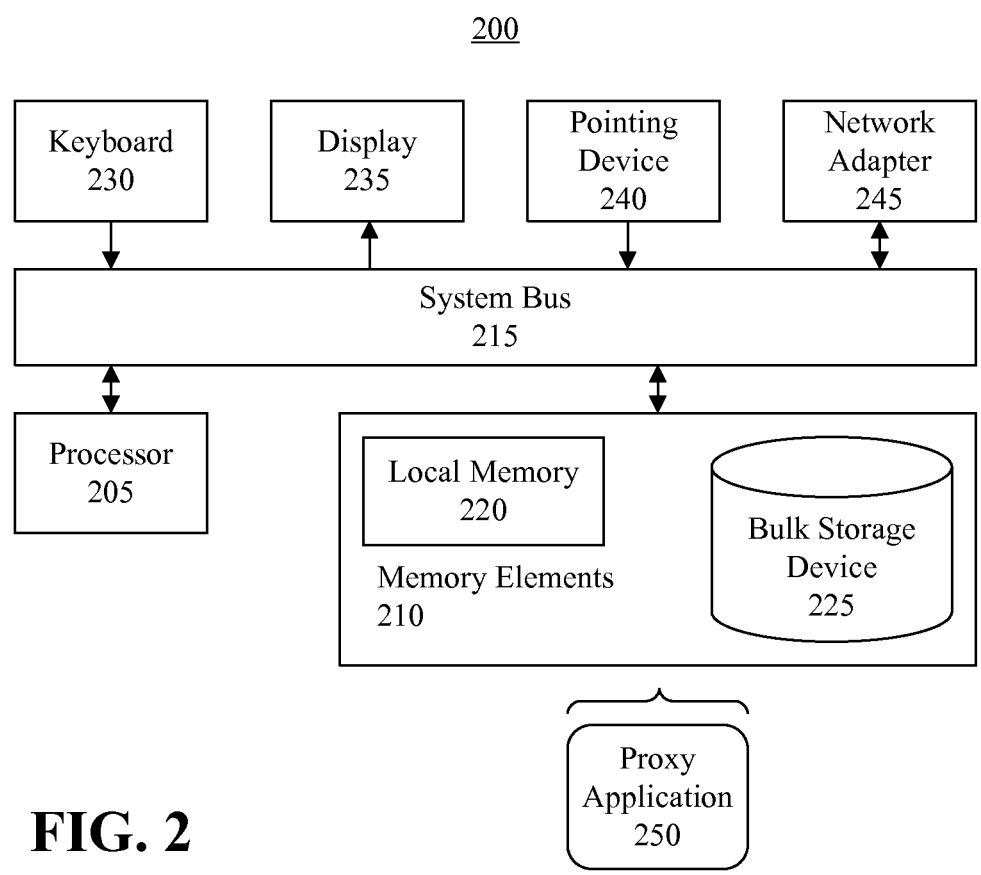
FIG. 2 is a block diagram illustrating an exemplary data processing system in accordance with another embodiment disclosed within this specification.

FIG. 2 is a block diagram illustrating an exemplary data processing system (system) 200 in accordance with another embodiment disclosed within this specification. System 200 illustrates an exemplary implementation of proxy 110 of FIG. 1. It should be appreciated, however, that one or more other components such as manager 120 and/or simulation component 125 can be implemented as a data processing system as described with reference to FIG. 2. Further, as noted, in another aspect, more than one component can be implemented within the same data processing system.

System 200 can include at least one processor 205 coupled to memory elements 210 through a system bus 215 or other suitable circuitry. As such, system 200 can store program code within memory elements 210. Processor 205 can execute the program code accessed from memory elements 210 via system bus 215. In one aspect, for example, system 200 can be implemented as a computer that is suitable for storing and/or executing program code. It should be appreciated, however, that system 200 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, and Ethernet cards are examples of different types of network adapters 245 that can be used with system 200.

As pictured in FIG. 2, memory elements 210 can store a proxy application 250. Proxy application 250, being implemented in the form of executable program code, can be executed by system 200 and, as such, can be considered part of system 200. Accordingly, system 200, in executing proxy application 250, can perform or implement the various executable operations described within this specification and attributed to proxy 110. Appreciably, were system 200 to illustrate manager 120 or simulation component 125, system 200 would execute a manager application or a simulation component application respectively and implement the executable operations attributed to either manager 120 or simulation component 125 as the case may be.

Figure 3:
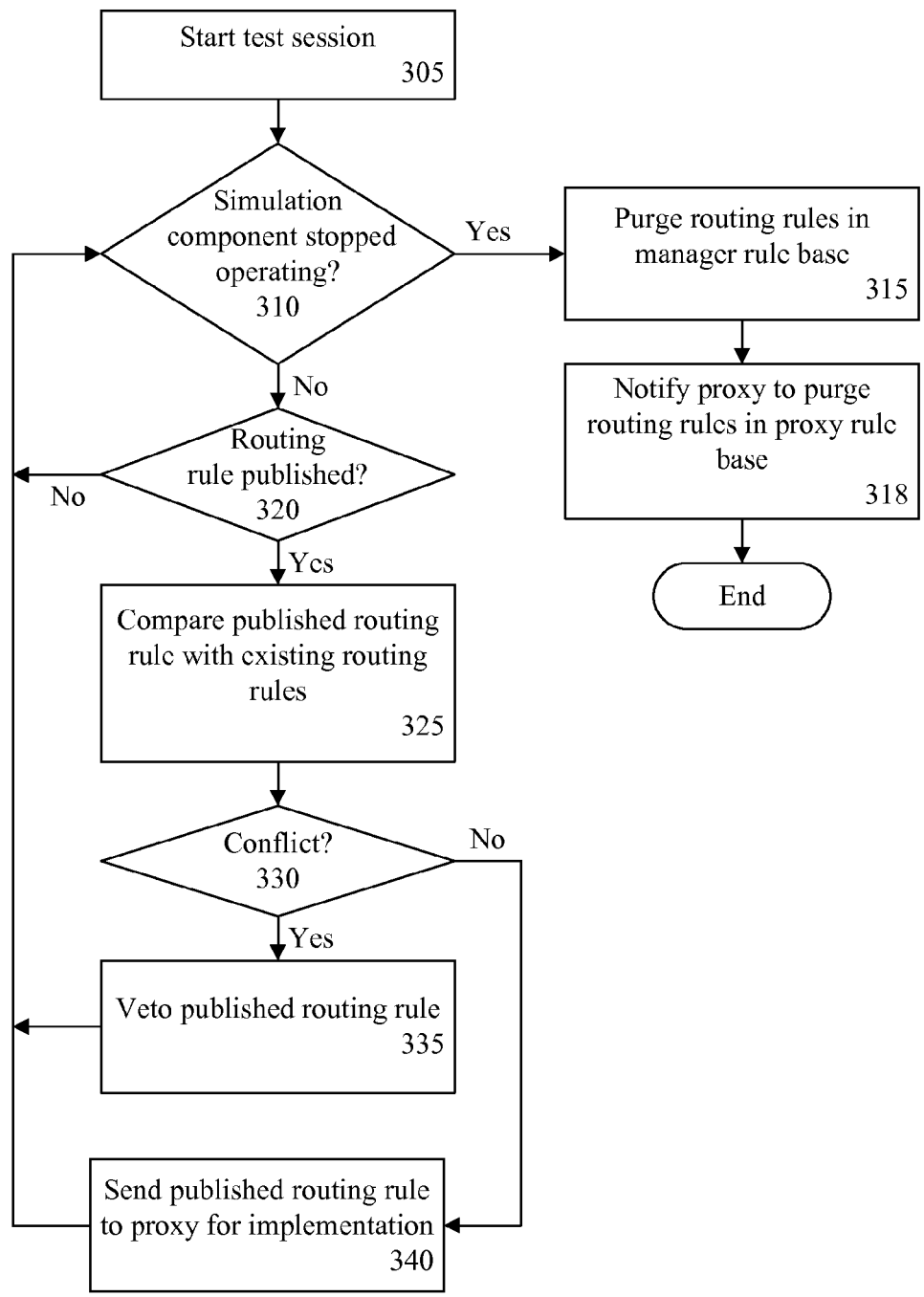
FIG. 3 is a flow chart illustrating a method of operation in accordance with another embodiment disclosed within this specification.

FIG. 3 is a flow chart illustrating a method 300 of operation in accordance with another embodiment disclosed within this specification. More particularly, FIG. 3 illustrates a method of operation for the manager described with reference to FIG. 1. Method 300 can begin in block 305 where a test session can be started and a simulation component is operating within the SUT.

In block 310, the manager can determine whether the simulation component has stopped operating, e.g., terminated or stopped testing activities. For example, the manager can receive a notice from the simulation component or monitor activity of the simulation component. If so, method 300 can continue to block 315. If not, method 300 can continue to block 320.

In general, the originator of a routing rule, or routing rules, can initiate or trigger the removal or purging of those routing rules. Accordingly, in block 315, the manager can purge the routing rules stored within the manager rule base for the simulation component that stopped operating. For example, the manager can purge all routing rules stored within the manager rule base that were published by the simulation component that stopped operating. In block 318, the manager can instruct the proxy to purge the routing rules stored within the proxy rule base that belong to, or were published by, the simulation component that stopped operating. After block 318, method 300 can end.

For purposes of illustration, method 300 is described as if a single simulation component were operating during the test session. More than one simulation component, however, can operate within the SUT concurrently during a test session. The multiple simulation components that are operating can implement parallel, but separate, testing activities. Each simulation component can interact with the manager. In that case, when one simulation component stops operating, only the routing rules published by the simulation component that stopped operating are removed from the manager rule base (and proxy rule base). Accordingly, routing rules published by other simulation components that are still operating are left intact and are still implemented by the proxy until removed from the manager and proxy rule bases.

Appreciably, when multiple simulation components are operating concurrently, method 300 can continue to iterate until all of the rules stored within the manager rule base are purged. When all rules of the manager rule base have been purged, e.g., the manager rule base is empty, no simulation components remain active in the SUT.

Continuing with block 320, the manager can determine whether a routing rule has been published by one or more of the simulation components within the SUT. If a routing rule has been published and is detected by the manager, method 300 can proceed to block 325. If not, method 300 can loop back to block 310 to continue processing.

In block 325, the manager can compare the published routing rule detected in block 320 with routing rules stored within the manager rule base. As noted, the manager maintains the manager rule base which is synchronized with the proxy rule base. Accordingly, any rules already published and implemented by the proxy are stored within the proxy rule base within the proxy and also within the manager rule base within the manager.

In block 330, the manager can determine whether the published rule conflicts with any of the existing rules within the manager rule base. If so, method 300 can proceed to block 335. If not, method 300 can continue to block 340. One example of a conflict can include the case where the published rule specifies same criteria as another rule, but a different destination. Another example of a conflict is when one routing rule is determined to be a more specific version of another routing rule.

Continuing with block 335, in the case of a conflict, the manager can veto the conflicting routing rule. As used within this specification, the term "veto" means that the routing rule that has been vetoed is rendered inoperable. In one example, the vetoed routing rule, which can be the published routing rule, is not entered into the manager rule base. In another aspect, the vetoed routing rule can be routing rule already within the manager rule base. In that case, the manager vetoes the routing rule by removing the routing rule from the manager rule base and instructing the proxy to remove the vetoed rule from the proxy rule base. In any case, the vetoed routing rule is not implemented within the SUT, e.g., by the proxy. In one aspect, the manager can send a notification to the test personnel that attempted to implement the routing rule of the conflict and that the routing rule was not, or is no longer, implemented within the SUT. After block 335, method 300 can loop back to block 310 to continue processing.

In another alternative embodiment, the manager can maintain both conflicting routing rules and render the more general routing rule inoperative. Being rendered inoperative, the manager does not synchronize the inoperative and conflicting routing rule with the proxy. In that case, when the more specific routing rule is eventually purged, the more general routing rule can be rendered operable and implemented within the proxy.

In block 340, in the case where the published routing rule does not conflict with the existing rules of the manager, the manager can send the published routing rule to the proxy for implementation. After block 340, method 300 can loop back to block 310 to continue processing.

Figure 4:
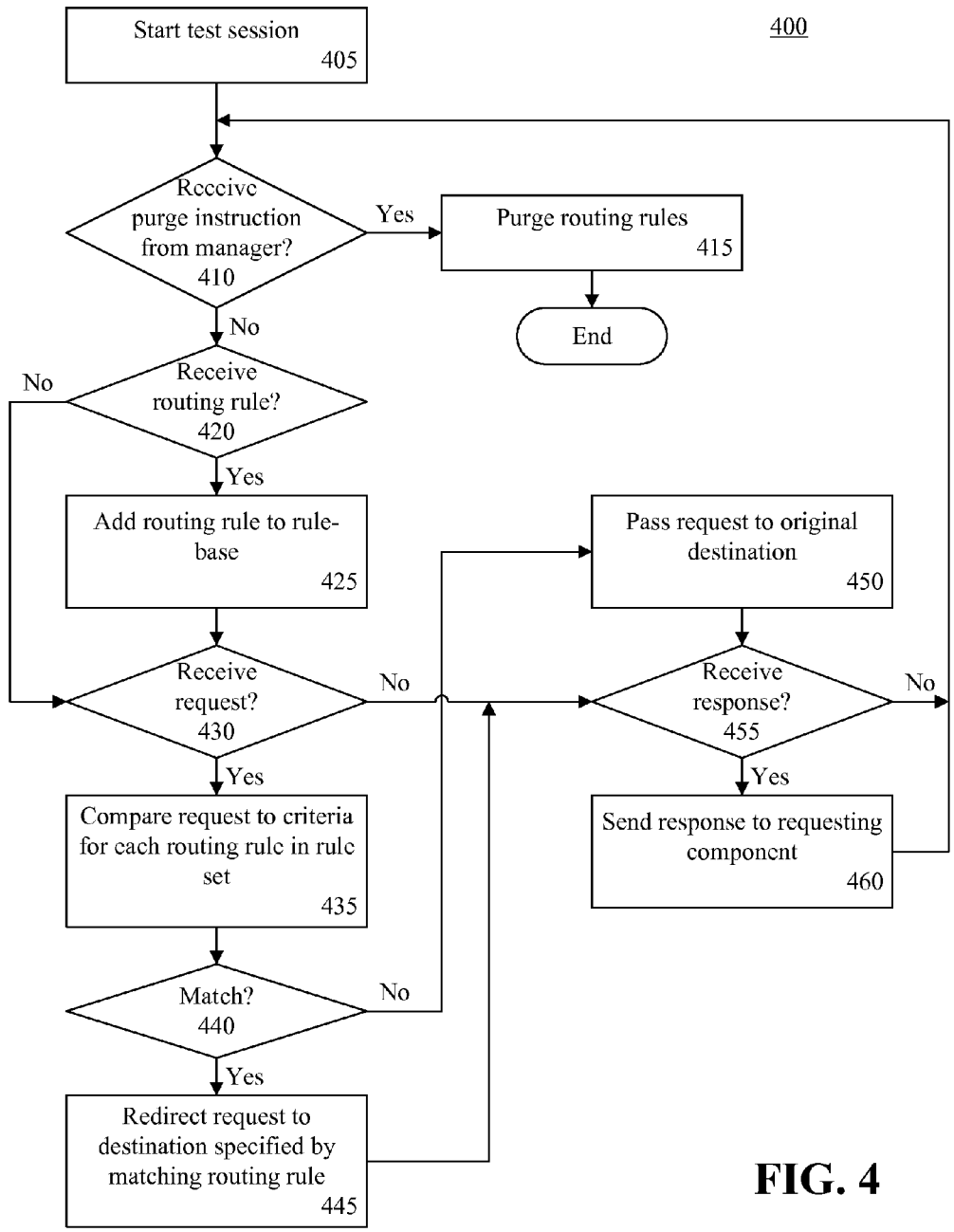
FIG. 4 is a flow chart illustrating a method of operation in accordance with another embodiment disclosed within this specification.

FIG. 4 is a flow chart illustrating a method 400 of operation in accordance with another embodiment disclosed within this specification. More particularly, FIG. 4 illustrates a method of operation for the proxy described with reference to FIG. 1. Method 400 can begin in block 405 where a test session can be started.

In block 410, the proxy can determine whether a purge instruction has been received from the manager. If so, method 400 can continue to block 415. If not, method 400 can proceed to block 420. In block 415, the proxy can purge any routing rules implemented for the current test session in accordance with the received purge instruction. In one aspect, the proxy can purge one or more routing rules explicitly indicated by the purge instruction. In another aspect, the proxy can purge any or all routing rules that were published, or originated by, a particular simulation component indicated by the purge instruction received from the manager.

As discussed, the proxy can delete or purge routing rules within the proxy rule base maintained therein according to instructions received from the manager. In general, the proxy purges all routing rules published from a particular source as indicated by the purge instruction. When all routing rules have been purged and the proxy rule base is empty, the proxy executes in the default mode. For any subsequent test session that is started, the proxy begins operation in the default mode. As noted, the default mode of the proxy is a mode in which no communication is redirected without first implementing at least one new routing rule for that test session within the proxy. After block 415, method 400 can end.

In block 420, the proxy can determine whether a routing rule has been received. The proxy can detect routing rules that have been sent from the manager. As discussed, any routing rule received from the manager has been determined not to conflict with any other routing rule in the manager rule base (or the proxy rule base since the two are synchronized). If a routing rule is received, method 400 continues to block 425 where the proxy adds the routing rule to the proxy rule base, thereby implementing the routing rule for the current test session. After block 425, method 400 continues to block 430. If a routing rule is not received, method 400 can continue from block 420 directly to block 430.

In block 430, the proxy determines whether a request has been received from an upstream component of the SUT. If a request is received, method 400 continues to block 435. If a block is not received, method 400 proceeds to block 455. In block 435, the proxy can compare the received request with the criteria specified for each of the routing rules included within the proxy rule base. In block 440, the proxy can determine whether the request matches at least one of the routing rules included within the proxy rule base. If so, method 400 can proceed to block 445. If not, method 400 can continue to block 455. In one aspect, the proxy can determine a single course of action by matching the request to a single routing rule. This condition can be ensured through proper conflict resolution within the manager as described.

The criteria of a routing rule can specify any of a variety of different parameters that are compared with a received request. Examples of the different criteria that can be specified by a routing rule include, but are not limited to, destination information specifying the particular downstream component to which a request is directed, source identifying information specifying the upstream component that sent or originated a request, one or more parameters to be observed within a header of the request or any portion thereof, one or more parameters to be observed in the payload (content) of the request and/or any portion thereof. The destination and/or source of a request can be specified by destination or source information, respectively, that can include, but is not limited to, connectivity information such as hostname, port, and/or URL. Still another example of criteria that can be specified in a routing rule can include a time range to which a time stamp of the request can be compared. A routing rule can specify a single criterion or two or more of the criteria listed and, for example, include Boolean expressions, regular expression, or the like to formulate the combinations of the criteria listed.

In block 445, the proxy can redirect the received request to the destination specified by the matching routing rule. As used within this specification, redirecting can include modifying the request to specify the destination of the matching routing rule, e.g., changing the destination from the original destination of the request as sent from the upstream component to the destination specified in the matching routing rule. The modified request can be sent to the destination specified by the matching routing rule as a relayed request. After block 445, method 400 can proceed to block 455.

In block 450, in the case where the request does not match a routing rule within the proxy rule base, the proxy passes the request to the original destination specified within the request as sent from the upstream component of the SUT. As discussed, the proxy can forward the request as a relayed request to the original destination.

In block 455, the proxy can determine whether a response is received. If so, method 400 can continue to block 460. If not, method 400 can loop back to block 410 to continue processing as described. In block 460, in the event that a response is received, whether from a simulation component or from a downstream component of the SUT, the proxy can send, e.g., forward or relay, the response to the appropriate upstream component awaiting the response.

In one aspect, the response that is received can designate the upstream component destination therein. In another aspect, however, the response may not specify the upstream component destination. In that case, the proxy can correlate the response with the request that was received and send the response to the appropriate upstream component, e.g., the upstream component that sent the request. After block 460, method 400 can loop back to block 410 to continue processing.

FIGS. 3 and 4 are provided for purposes of illustration only. It should be appreciated that the proxy can evaluate one or more rules. As such, the proxy can redirect requests from multiple upstream components to one or more different simulation components and/or original downstream components in accordance with the routing rules implemented at any given time. In effect, the proxy provides selective and parallelized simulation on a per-interaction basis thereby enabling concurrent testing activity within a single test environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method, comprising:
   receiving, from an upstream component and by a proxy included within a system under test, a request that is directed to a downstream component;
   redirecting, by the proxy and based upon a routing rule within the proxy, the request from the downstream component to a simulation component;
   receiving, from the simulation component and by the proxy, a response to the request; and
   forwarding, by the proxy, the response to the upstream component, wherein
   the routing rule compares at least a portion of a payload of the request with the routing rule.

2. The method of claim 1, wherein
   the routing rule specifies the simulation component as a destination.

3. The method of claim 1, wherein
   the routing rule includes at least one of:
   destination information of the request,
   sender information of the request, and
   a time stamp of the request.

4. The method of claim 1, wherein
   the response is a simulation response.

5. The method of claim 1, further comprising
   publishing the routing rule within the system under test for implementation within the proxy.

6. The method of claim 5, further comprising
   purging, responsive to the simulation component ceasing operation, the routing rule from the proxy.

7. A computer hardware system, comprising:
   at least one hardware processor, within a proxy included within a system under test, configured to initiate the following executable operations:
      receiving, from an upstream component, a request that is directed to a downstream component;
      redirecting, based upon a routing rule within the proxy, the request from the downstream component to a simulation component;
      receiving, from the simulation component, a response to the request; and
      forwarding the response to the upstream component, wherein
   the routing rule compares at least a portion of a payload of the request with the routing rule.

8. The system of claim 7, wherein
   the routing rule specifies the simulation component as a destination.

9. The system of claim 7, wherein
   the routing rule includes at least one of:
   destination information of the request,
   sender information of the request, and
   a time stamp of the request.

10. The system of claim 7, wherein
    the response is a simulation response.

11. The system of claim 7, wherein the executable operations further include
    publishing the routing rule within the system under test for implementation within the proxy.

12. The system of claim 11, wherein the executable operations further include
    purging, responsive to the simulation component ceasing operation, the routing rule from the proxy.

13. A computer program product, comprising:
    a computer readable storage medium having computer readable program code embodied therewith that, when executed, configures a processor to perform the following executable operations:
       receiving, from an upstream component and by a proxy included within a system under test, a request that is directed to a downstream component;
       redirecting, by the proxy and based upon a routing rule within the proxy, the request from the downstream component to a simulation component;
       receiving, from the simulation component and by the proxy, a response to the request; and
       forwarding, by the proxy, the response to the upstream component, wherein
    the routing rule compares at least a portion of a payload of the request with the routing rule.

14. The computer program product of claim 13, wherein
    the routing rule specifies the simulation component as a destination.

15. The computer program product of claim 13, wherein
    the routing rule includes at least one of:
    destination information of the request,
    sender information of the request, and
    a time stamp of the request.

16. The computer program product of claim 13, wherein
    the response is a simulation response.

17. The computer program product of claim 13, wherein the executable operations further include
    publishing the routing rule within the system under test for implementation within the proxy.

* * * * *